July 11, 1967   R. J. CUNNINGHAM   3,331,013
ELECTRICAL POWER OUTLET CONTROL
Filed April 13, 1964

INVENTOR.
RONALD J. CUNNINGHAM
BY
Herzig & Walsh
ATTORNEYS

United States Patent Office 3,331,013
Patented July 11, 1967

3,331,013
ELECTRICAL POWER OUTLET CONTROL
Ronald James Cunningham, 5445 Riverside Place,
Los Angeles, Calif. 90039
Filed Apr. 13, 1964, Ser. No. 359,029
8 Claims. (Cl. 323—22)

This invention relates to a proportional electrical power control device and more particularly to a dimmer circuit which is incorporated in a small electrical receptacle which can be connected to any conventional electrical outlet and to which a conventional light bulb or other electrical appliance can be connected for control thereby.

Certain prior art devices are available for dimming a conventional light bulb. While generally satisfactory, these devices have the disadvantage that they are relatively large devices adding to the bulk of an electrical outlet employing the device.

Another disadvantage resides in the fact that, when such devices are employed for controlling the amount of heat given off by an electrical heating device, they employ a rheostat control having only a predetermined number of positions which does not impart enough flexibility temperaturewise to maintain a constant, desired temperature.

In view of the foregoing factors and conditions characteristic of proportional electrical control devices, it is a primary object of the present invention to provide a new and useful proportional electrical control device not subject to the disadvantages enumerated above and having means for connecting it to a conventional electrical outlet.

Another object of the present invention is to provide a transistorized proportional electrical control device.

Yet another object of the present invention is to provide a proportional electrical power control device which is infinitely adjustable to maintain a heating appliance at a desired temperature.

A further object of the present invention is to provide a proportional electrical control device especially designed for maintaining heating pads at a desired temperature.

A still further object of the present invention is to provide a proportional electrical control device incorporating a full wave rectifier and a phase control circuit into a small electrical socket having a built-in manual adjusting disk which can be adjusted to select the fraction of the incoming pulses which is converted into power through a lamp or other electrical device connected to the socket, whereby the intensity of the lamp is variable.

According to the present invention, a dimmer circuit is built into an electrical device adapted to be connected to any conventional electrical outlet and having receptacle means for receiving a light bulb or other electrical appliance. A manual adjustment disk is built into the device to control a circuit which is also built into the device.

The circuit can receive 115 volts AC at 60 to 400 cycles, for example, and includes a full wave rectifier for rectifying the voltage. The circuit acts as a phase control whereby any fraction of the incoming pulses is converted into power through a lamp or other electrical appliance connected to the device so that the intensity of the lamp is variable.

The circuit includes a uni-junction transistor across which is connected a voltage divider comprising a rheostat in series with a condenser. A resistor connects the transistor in series with a suitable ground. The transistor is also connected to the firing gate of a silicon controlled rectifier.

A zener diode is provided for controlling the voltage across the uni-junction transistor. The output of the full wave rectifier is connected to a silicon controlled rectifier which, in turn, is connected to ground returning to the negative side of the full wave bridge.

The electrical device may include receptacle means into which a thermistor may be plugged. The most common types of thermistors exhibit a negative temperature coefficient of resistance. Such a thermistor may be connected across the capacitor, in which case the power delivered to the appliance decreases as temperature increases. The less common types of thermistors which have positive temperature coefficients of resistance may be placed in series with the capacitor, to decrease the power delivered to the appliance as temperature increases.

When a thermistor is plugged into the electrical device it has a particular application, for example, with an infrared source of light, the bulb being positioned close enough to the thermistor so that heat from the bulb affects the thermistor which, accordingly, operates to maintain a constant temperature. The temperature is infinitely adjustable by the operator merely by adjusting the rheostat. The modified form of the invention can also be used to control foot warmers in an office, or heating pads and the like safely, efficiently, and economically.

The features of the present invention which are believed to be novel are set forth with particularity in the appended claims. The present invention, both as to its organization and manner of operation, together with further objects and advantages thereof, may best be understood by reference to the following description taken in connection with the accompanying drawings in which like reference characters refer to like elements in the several views.

Figure 1:
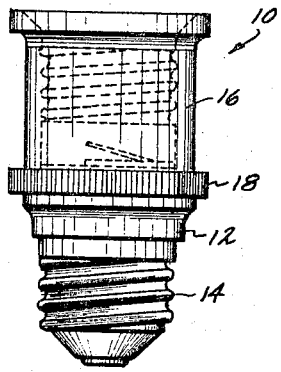
FIGURE 1 is an elevational view of a proportional electrical control device of the present invention.
Figure 2:
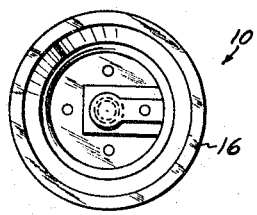
FIGURE 2 is a plan view of FIGURE 1.
Figure 3:
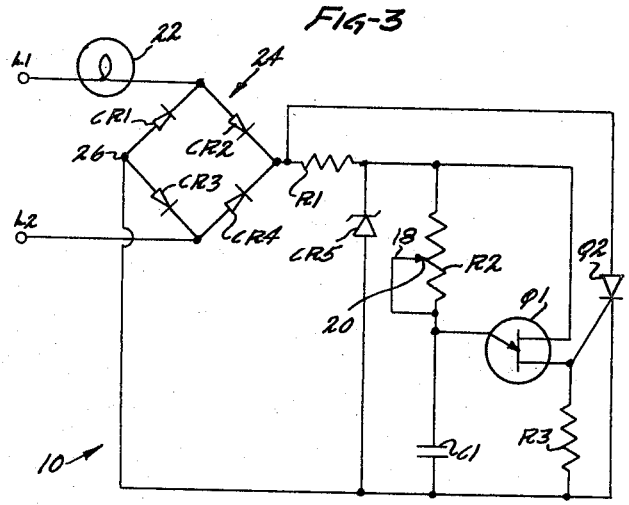
FIGURE 3 is a wire diagram of the electrical circuit incorporated in the device of FIGURE 1.

Referring again to the drawings and particularly to FIGURES 1–3, the proportional electrical control device constituting a first embodiment of the present invention, generally designated 10, includes an electrical socket 12. The electrical socket 12 includes an externally threaded base 14 which may be screwed into any conventional electrical receptacle, not shown, to connect the device 10 to a source of electrical power.

The socket 12 includes an internally threaded body portion 16 which is adapted to receive a conventional light bulb, not shown, or which may receive an externally threaded socket adapted to receive a prong-type electrical connector.

The electrical circuit shown in FIGURE 3 may be incorporated in the base 14 and is controlled by a knurled disk 18 which is rotatably mounted on the base 14. The disk 18 is connected to rheostat R2 and controls the position of its wiper 20. The electrical circuit shown in FIGURE 3 may be connected to a suitable source of power, such as a 115-volt AC, 60 to 400 cycle source, by leads L1 and L2 to control a suitable electrical appliance, such as the lamp 22. Incoming voltage is rectified by a full wave rectifier 24 having diodes CR1, CR2, CR3 and CR4 connected together in series. The circuit, to be hereinafter more fully described, acts as a phase control whereby any fraction of the incoming pulses is converted into power through the lamp 22 so that the intensity of the lamp 22 is variable.

The circuit includes a uni-junction transistor Q1 across which is connected a voltage divider comprising the rheostat R2 in series with a condenser C1. A resistor R3 to ground is connected in series with the transistor Q1, and to the firing gate of a silicon controlled rectifier Q2. The voltage across the uni-junction transistor Q1 is controlled by a zener diode CR5.

The output of the full wave rectifier 24 is connected to the silicon controlled rectifier Q2 which returns to the negative side 26 of the full wave rectifier 24. The output of the rectifier 24 is also connected to a resistor R1.

In operation, a positive pulse entering on line L1 through lamp 22 appears at the junction of diodes CR1 and CR2 and, being positive, is conducted through the diode CR2 to the junction of resistor R1 and the anode of the silicon controlled rectifier Q2. This pulse is coupled through resistor R1 to the junction of the zener diode CR5, the rheostat R2 and the transistor Q1. When this voltage exceeds a predetermined amount, the zener diode CR5 conducts shunting the voltage to ground. The predetermined voltage is allowed to charge condenser C1 through the rheostat R2 and the amount of resistance on rheostat R2 determines the time constant. This controls the phase angle of conduction by firing the transistor Q1 which, in turn, fires the silicon controlled rectifier Q2 establishing a short circuit between the junction of the cathodes of diodes CR2 and CR4 to the junction of the anodes of diodes CR1 and CR3. Of course, the reverse is true when line L2 is positive and line L1 is negative. In this manner, any fraction of each pulse, whether positive or negative, can be converted into power for operating the lamp 22 by adjusting the disk 18.

Figure 4:
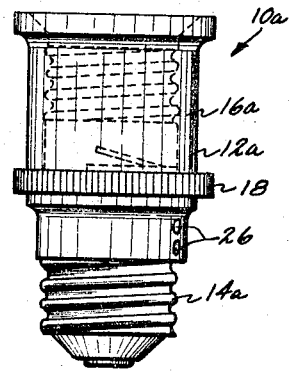
FIGURE 4 is an elevational view of a device similar to that shown in FIGURE 1 which has been modified to include receptacle means for receiving a thermistor.
Figure 5:
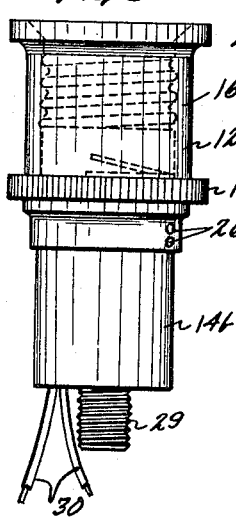
FIGURE 5 is an elevational view of a device similar to that shown in FIGURE 4 which has been modified to include threaded nipple means.
Figure 6:
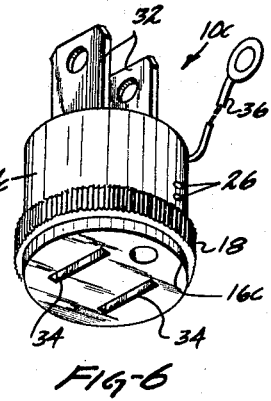
FIGURE 6 is a perspective view of a device of the type shown in FIGURE 4 which has been modified to include prongs and receptacles for receiving prong-type electrical plugs.

The circuit shown in FIGURE 3 may also be incorporated in the proportional control devices 10a, 10b and 10c shown in FIGURES 4, 5 and 6, respectively. The proportional control device 10a includes an electrical socket 12a having an externally threaded base 14a which may be screwed into any conventional electrical receptacle, not shown, to connect the device 10a to a source of electrical power. The socket 12a also includes an internally threaded body portion 16a which is adapted to receive a conventional light bulb, not shown, or which may receive any externally threaded socket adapted to receive a prong-type electrical connector. The electrical circuit shown in FIGURE 3 may be incorporated in the base 14a and is controlled by the knurled disk 18 which is rotatably mounted on the base 14a.

Figure 7:
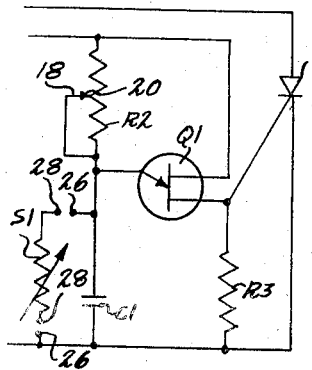
FIGURE 7 is a wiring diagram of a portion of the circuit of FIGURE 3 which has been modified to include a first thermistor.
Figure 8:
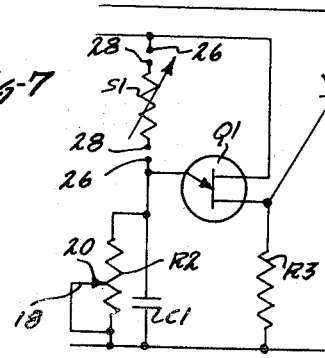
FIGURE 8 is a wiring diagram of a portion of the circuit of FIGURE 3 which has been modified to include a second thermistor.

Provision for attaching a temperature sensing element to the proportional control device 10a may be made by mounting a receptacle 26 in its base 14a. With the circuit shown in FIGURE 3 incorporated in the base 14a, the receptacle 26 may be connected across the capacitor C1. A thermistor S1 which includes pins shown diagrammatically at 28 in FIGURE 7, may be plugged into the receptacle 26 thereby connecting the thermistor S1 across the condensor C1; the power delivered to the appliance will decrease as temperature increases for a thermistor with a negative temperature coefficient of resistance, and the power will increase as temperature increases for a thermistor with a positive coefficient. Alternatively, the circuits shown in FIGURE 3 may be modified as shown in FIGURE 8 by replacing the rheostat R2 with the receptacle 26 and by wiring the rheostat R2 across the capacitor C1. The thermistor S1 will then have the effect of causing the power delivered to the appliance to increase as temperature increases for a thermistor with negative coefficient of resistance and causing the power to decrease as temperature increases for a thermistor with positive coefficient of resistance. Generally the coefficient of resistance of a thermistor should be more than about 1% per degree centigrade as opposed to ordinary carbon or film resistors whose coefficients are almost always less than about 0.5% per degree centigrade.

The proportional control device 10b shown in FIGURE 5 includes an electrical socket 12b having a base 14b from which an externally threaded nipple 29 depends. The nipple 29 may be employed to connect the device 10b to a mounting tube, not shown. The electrical socket 12b also includes an internally threaded body portion 16b which is adapted to receive a conventional light bulb, not shown, or which may receive an externally threaded socket. The circuit shown in FIGURE 3 may be incorporated in the base 14b and is connected to a source of power by the leads 30 extending from the base 14b. A control disk 18 is rotatably mounted on base 14b and is connected to wiper 20. The receptacle 26 also may be incorporated in the base 14b and the electrical circuit may be modified as shown in FIGURES 7 and 8 so that the thermistor S1 can be employed in the alternate methods previously described.

The proportional control device 10c shown in FIGURE 6 includes a base 14c from which prongs 32 extend for connecting the device 10c to a source of electrical power. The device 10c also includes a body portion 16c which is provided with receptacles 34 which are adapted to receive a conventional prong-type electrical connector. The device 10c may be grounded with a ground wire 36 and is provided with the receptacle 26 so that the circuit shown in FIGURE 3 may be incorporated in the base 14c and modified alternatively as shown in FIGURES 7 and 8 so that the thermistor S1 may be used in conjunction with the circuit shown in FIGURE 3. The device 10c is also controlled with the disk 18 which may be rotatably mounted on base 14c and connected to wiper 20.

The control devices 10a, 10b and 10c may be used with an infrared source of light wherein an infrared bulb, not shown, may be positioned close enough to the thermistor S1 so that heat from the bulb affects the thermistor which operates to maintain a constant temperature. This temperature is infinitely adjustable by the operator by merely rotating disk 18 to adjust R2.

While the particular proportional electrical control devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A proportional electrical control device for controlling an electrical appliance comprising:
   a body portion including electrical receptacle means for connecting an appliance to be controlled by said device to said body portion and means for connecting said body portion to a source of electrical power;
   a rotatable disk encompassing said body portion;
   an electrical circuit mounted in said body portion, said circuit being connected to said means for connecting said body portion to a source of electrical power and said electrical receptacle means, and including means for converting predetermined fractions of pulses of current entering said body portion into power for operating said appliance, said disk being connected to said circuit for selecting said predetermined fractions; and
   a thermistor connected to said electrical circuit for maintaining said appliance at a constant temperature.

2. The device of claim 1 wherein said thermistor has a positive-going coefficient.

3. The device of claim 1 wherein said thermistor has a negative-going coefficient.

4. The device of claim 1 wherein said means for connecting an appliance to said body portion comprises an internally threaded socket and said means for connecting said body portion to a source of electrical power comprises an externally threaded base.

5. The device of claim 1 wherein said means for connecting an appliance to said body portion comprises an internally threaded socket and said means for connecting said body portion to a source of electrical power comprises electrical leads extending from said body portion and wherein an externally threaded nipple depends from said body portion for connecting said device to a mounting tube.

6. The device of claim 1 wherein said means for connecting an appliance to said body portion comprises receptacle means for receiving a prong-type plug and said means for connecting said body portion to a source of power comprises electrical prongs.

7. A proportional electrical control device for controlling the operation of an electrical appliance comprising:

a receptacle for connecting said appliance to a source of electrical power, said receptacle including a threaded base portion for screwing into an electrical socket of predetermined outer thread diameter;

a control disk rotatably mounted on said receptacle, said disk of a diameter larger than the diameter of said predetermined thread diameter and less than twice said predetermined diameter; and an electrical circuit connecting said appliance to said source of power through said control disk comprising:

a full wave rectifier having a positive side and a negative side;

a silicon controlled rectifier connected across said positive and negative sides of said full wave rectifier, said silicon controlled rectifier having a firing gate;

a first resistor connected to said positive side and to a fixed junction;

a uni-junction transistor connected between said fixed junction and said firing gate;

a second resistor connecting said uni-junction transistor to said negative side;

a voltage divider connected to said junction across said transistor, said voltage divider including a rheostat in series with a condenser; and a zener diode connected to said junction for controlling the voltage across said uni-junction transistor.

8. The device of claim 7 wherein said circuit includes a thermistor for controlling the temperature of said appliance.

References Cited

UNITED STATES PATENTS

| | | | |
|---|---|---|---|
| 3,103,618 | 9/1963 | Slater | 323—22 |
| 3,109,910 | 11/1963 | Fogleman | 219—20 |
| 3,131,545 | 5/1964 | Gross | 62—3 |
| 3,146,392 | 8/1964 | Sylvan | 323—22 |
| 3,147,928 | 9/1964 | Carpenter | 240—123 |

JOHN F. COUCH, *Primary Examiner.*

K. D. MOORE, M. L. WACHTELL, *Assistant Examiners.*